(12) United States Patent
Jang et al.

(10) Patent No.: US 8,541,921 B2
(45) Date of Patent: Sep. 24, 2013

(54) STATOR FOR MOTOR

(75) Inventors: Jeong Cheol Jang, Gwanju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 85 days.

(21) Appl. No.: 13/395,510

(22) PCT Filed: Oct. 23, 2010

(86) PCT No.: PCT/KR2010/007306
§ 371 (c)(1),
(2), (4) Date: Mar. 12, 2012

(87) PCT Pub. No.: WO2011/052936
PCT Pub. Date: May 5, 2011

(65) Prior Publication Data
US 2012/0206009 A1    Aug. 16, 2012

(30) Foreign Application Priority Data
Oct. 29, 2009  (KR) .......................... 10-2009-0103478

(51) Int. Cl.
*H02K 1/00*    (2006.01)
(52) U.S. Cl.
USPC .......................................... 310/179; 310/215
(58) Field of Classification Search
USPC .................................... 310/179, 214, 215, 71
See application file for complete search history.

(56) References Cited

U.S. PATENT DOCUMENTS

| | | | |
|---|---|---|---|
| 2004/0183388 A1* | 9/2004 | Rittmeyer | 310/179 |
| 2009/0102310 A1* | 4/2009 | Amano | 310/215 |
| 2012/0169173 A1* | 7/2012 | Jang et al. | 310/215 |

FOREIGN PATENT DOCUMENTS

| | | |
|---|---|---|
| JP | 2002-281708 A | 9/2002 |
| JP | 2004-096838 A | 3/2004 |
| KR | 10-2005-0056284 A | 6/2005 |
| KR | 10-2006-0027704 A | 3/2006 |
| KR | 10-2007-0013779 A | 1/2007 |

* cited by examiner

*Primary Examiner* — Nguyen N Hanh
(74) *Attorney, Agent, or Firm* — Sherr & Jiang, PLLC

(57) ABSTRACT

The present invention relates to a stator for a motor having a stator core having an annular back yoke and teeth protruded annularly in a radial direction from the back yoke, a plurality of coils adapted to be wound on the teeth, and an insulator adapted to cover the stator core and the coils for insulation and having supporting ends formed sequentially to have different heights so as to support the plurality of coils thereon, thereby preventing the plurality of coils from being in contact with one another and locking projections formed at both sides or one side of the supporting ends so as to prevent the coils from escaping from the supporting ends, wherein each of the supporting ends has a stepped groove formed at a position spaced apart by a predetermined distance from the locking projections so as to allow the nozzle of the coil winding machine to be accessed thereto, and a total of the depth of the stepped groove and the height of each of the locking projections is larger than the radius of the nozzle.

1 Claim, 4 Drawing Sheets

STATOR FOR MOTOR

CROSS REFERENCE TO PRIOR APPLICATIONS

This application is a National Stage Patent Application of PCT International Patent Application No. PCT/KR2010/007306 (filed on Oct. 23, 2010) under 35 U.S.C. §371, which claims priority to Korean Patent Application No. 10-2009-0103478 (filed on Oct. 29, 2009), which are all hereby incorporated by reference in their entirety.

TECHNICAL FIELD

The present invention relates to a stator for a motor, and more particularly, to a stator for a motor that has a structure in which supporting ends formed on an insulator for insulating a stator core and coils have stepped grooves to which a nozzle of a coil winding machine is accessed, thereby preventing the coils from escaping from the supporting ends during a coil winding operation.

BACKGROUND ART

In general, a motor transmits a rotating force of a rotor to a rotating shaft which drives a load. For example, the rotating shaft of the motor can drive a drum of a washing machine connected thereto, or a fan of a refrigerator connected thereto for supplying cold air to a required space.

Recently, a BLDC (brushless direct current) motor has been widely used since it has no brush to cause almost suppression of noise and to provide extended life span. The rotor in the BLDC motor becomes rotated through an electromagnetic interaction with a stator. So as to perform the electromagnetic interaction, coils, which are made of a material like copper or aluminum, are wound on the stator, and as electric current is applied to the coils, the rotor rotates with respect to the stator.

FIGS. 1 to 3 show a conventional stator for a motor, wherein FIG. 1 is a perspective view showing the conventional stator for a motor, FIG. 2 is a perspective view showing the state wherein a coil drawn from a nozzle of a coil winding machine is wound on the conventional stator for a motor, and FIG. 3 is a conceptual perspective view showing the state wherein the coil drawn from the nozzle of the coil winding machine escapes from the locking projection in the conventional stator for a motor.

Referring to the drawings, a stator 1 for a motor generally includes a stator core having an annular back yoke 11 and a plurality of teeth 12 protruded annularly in a radial direction from the back yoke 11, coils 31, 32 and 33 adapted to be wound on the teeth 12, an insulator 20 adapted to cover the stator core so as to insulate the stator core and the coils 31, 32 and 33 and having supporting ends 21, 22 and 23 formed sequentially to have different heights from one another so as to support the coils 31, 32 and 33 thereon, thereby preventing the coils 31, 32 and 33 from being in contact with one another and locking projections 21a, 21b, 22a, 22b, 23a and 23b formed on both sides or one side of the supporting ends 21, 22 and 23 so as to lock the coils 31, 32 and 33 thereon, thereby preventing the coils 31, 32 and 33 from escaping from the supporting ends 21, 22 and 23. Referring to the drawings, the insulator 20 is classified into an upper insulator 20a and a lower insulator 20b adapted to coupled to the top and underside of the stator core.

In case of an inner rotor type motor, the teeth 12 are extended projected inwardly in a radial direction from an inner circumference of the stator core, and contrarily, in case of an outer rotor type motor, the teeth 12 are extended projected outwardly in a radial direction from an outer circumference of the stator core.

The plurality of coils 31, 32 and 33 are wound on the teeth 12 periodically along one circle of the stator core, and the plurality of coils 31, 32 and 33 are wound alternately within one period. The number of coils 31, 32 and 33 is the same as the number of electric currents supplied to the stator of the motor, and the coils 31, 32 and 33 are wound continuously on the teeth 12 every period corresponding to the constants of the electric currents until the winding on the stator core is finished. In the drawings, the three coils 31, 32 and 33 are wound to supply the electric currents of three phases, and the stator used for the outer rotor motor is shown.

In the meantime, each coil is drawn from one of the teeth 12 disposed within a predetermined period and extended to one of the teeth 12 disposed within the next period. Then, the coil goes to the extended tooth 12. Accordingly, so as to extendedly draw the plurality of coils 31, 32 and 33 from the respective teeth 12 and to go to the respective teeth 12 disposed within the next period, the extended portions of the coils 31, 32 and 33 are supported against the supporting ends 21, 22 and 23 formed to have different heights from one another, such that the extended portions of the coils 31, 32 and 33 are not in contact with one another.

The supporting ends 21, 22 and 23 are formed at the different heights from one another and serve to allow the three coils 31, 32 and 33 to be placed thereon, thereby extending the coils to another teeth 12 therethrough. The supporting ends 21, 22 and 23 have locking projections 21a, 21b, 22a, 22b, 23a and 23b formed at one sides or both sides thereof so as to lock the coils 31, 32 and 33 thereon, thereby preventing the coils 31, 32 and 33 from escaping therefrom.

The coil winding operation wherein the coils 31, 32 and 33 are drawn from the respective teeth 12 and extended to the respective teeth 12 within the next period in the state of being supported by means of the supporting ends 21, 22 and 23 is carried out through a coil winding machine. FIG. 2 shows the winding state of one coil wherein the coil 33 supported on the highest supporting end 23 is drawn from the nozzle N and wound on the corresponding tooth. As shown in FIG. 2, in the coil winding machine for winding the coil 33 on the corresponding tooth, the nozzle N from which the coil 33 is drawn is accessed in vicinity of the teeth 12 and is turn around the corresponding tooth to wind the coil 33 on the corresponding tooth. Next, so as to move the coil 33 to next tooth in the state wherein the coil 33 is supported on the supporting end 23, the nozzle N of the coil winding machine is accessed over the support end 23 disposed between the locking projections 23a and 23b. At this time, if the heights of the locking projections 23a and 23b are low, the coil 33 drawn from the nozzle N is not locked on the locking projections 23a and 23b at both sides of the supporting end 23, thereby escaping from the supporting end 23. FIG. 3 shows the state wherein the coil 33 drawn from the nozzle N is not locked on the locking projections 23a and 23b, thereby escaping from the supporting end 23. The above-mentioned problems are caused when the heights of the locking projections 23a and 23b become low to obtain a compact motor, and especially, they are seriously caused when the height h of each of the locking projections 23a and 23b is smaller than the radius r of the nozzle N.

DISCLOSURE OF INVENTION

Technical Problem

Accordingly, the present invention has been made in view of the above-mentioned problems occurring in the prior art, and it is an object of the present invention to provide a stator for a motor that is configured wherein supporting ends formed on an insulator for insulating a stator core and coils have stepped grooves to which a nozzle of a coil winding machine is accessed, thereby preventing the coils from escaping from the supporting ends during a coil winding operation.

The above object and other objects of the present invention will be easily achieved by a preferred embodiment of the present invention as will be described below.

Solution to Problem

To accomplish the above object, according to the present invention, there is provided a stator for a motor having a stator core having an annular back yoke and teeth protruded annularly in a radial direction from the back yoke, a plurality of coils adapted to be wound on the teeth, and an insulator adapted to cover the stator core and the plurality of coils for insulation and having supporting ends formed sequentially to have different heights so as to support the plurality of coils thereon, thereby preventing the plurality of coils from being in contact with one another and locking projections formed at both sides or one side of the supporting ends so as to prevent the plurality of coils from escaping from the supporting ends, wherein each of the supporting ends having the locking projections having a height h smaller than a radius r of a nozzle N of a coil winding machine has a stepped groove formed at a position spaced apart by a predetermined distance from the locking projections so as to allow the nozzle of the coil winding machine to be accessed thereto, and a total of the depth of the stepped groove and the height of each of the locking projections is larger than the radius of the nozzle.

Advantageous Effects of Invention

Under the above-mentioned structure, the stator for the motor according to the present invention has an advantage in that the supporting ends formed on the insulator for insulating the stator core and the coils have the stepped grooves to which the nozzle of the coil winding machine is accessed, thereby preventing the coils from escaping from the supporting ends during a coil winding operation.

BEST MODE FOR CARRYING OUT THE INVENTION

Hereinafter, an explanation on a stator for a motor according to the present invention will be in detail given with reference to the attached drawings.

Figure 4:
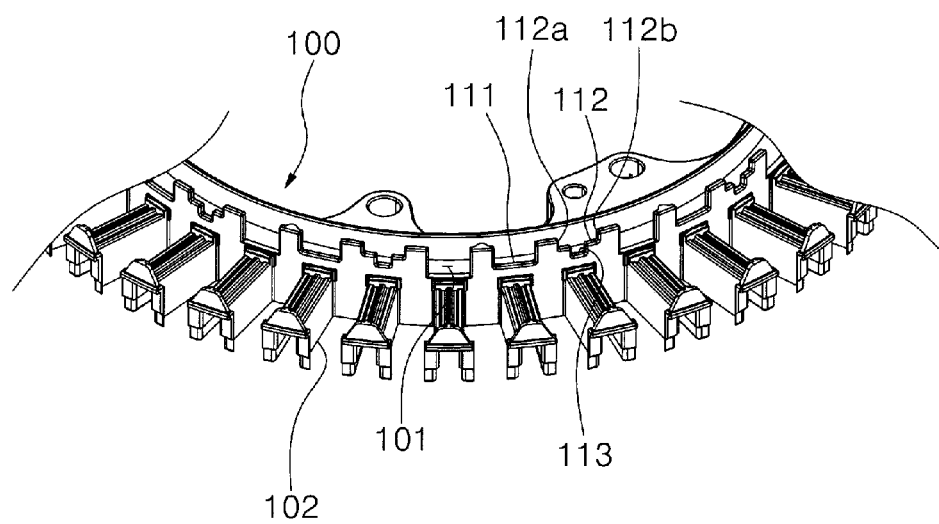
FIG. 4 is a perspective view showing an upper insulator in a stator for a motor according to the present invention.
Figure 5:
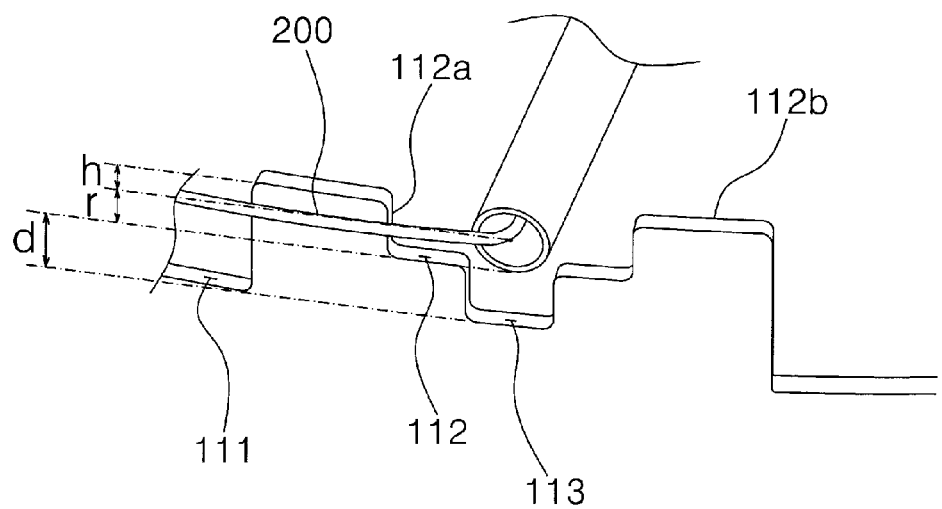
FIG. 5 is a conceptual perspective view showing a state wherein a coil is locked during the winding on a locking projection in the stator for a motor according to the present invention.

FIG. 4 is a perspective view showing an upper insulator in a stator for a motor according to the present invention, and FIG. 5 is a conceptual perspective view showing a state wherein a coil is locked during the winding on a locking projection in the stator for a motor according to the present invention.

The stator for a motor according to the present invention includes a stator core having an annular back yoke and teeth protruded annularly in a radial direction from the back yoke and a plurality of coils adapted to be wound on the teeth, but the present invention relates to an insulator that serves to insulate the stator core and the coils wound on the teeth of the stator core and has a structure wherein the coils are passed without any contact with one another. Accordingly, the characteristics of the stator for a motor according to the present invention will be discussed with respect to the insulator, especially, an upper insulator 100.

Figure 1:
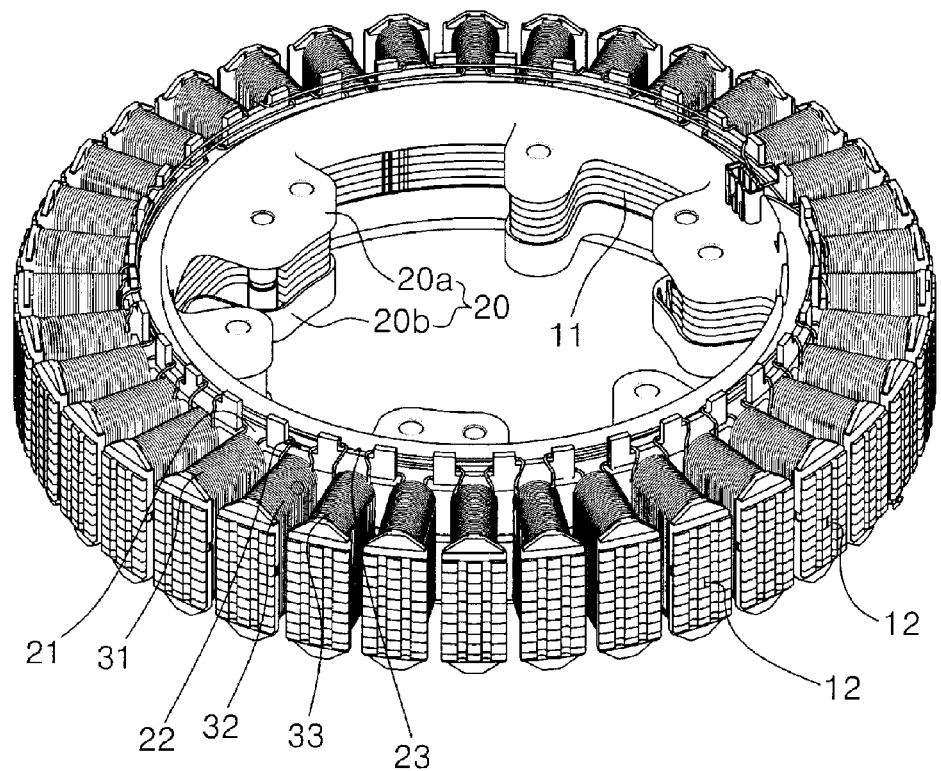
FIG. 1 is a perspective view showing a conventional stator for a motor.
Figure 2:
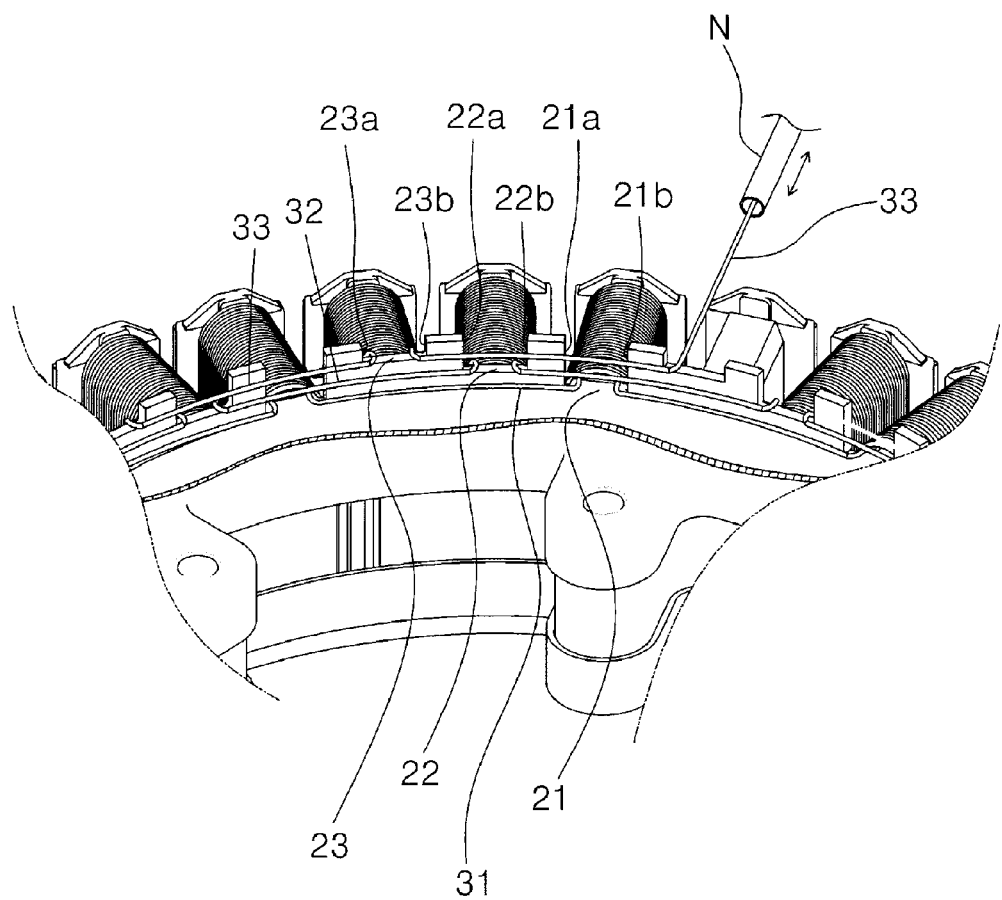
FIG. 2 is a perspective view showing a state wherein a coil is drawn from a nozzle of a coil winding machine and wound on tooth in the conventional stator for a motor.
Figure 3:
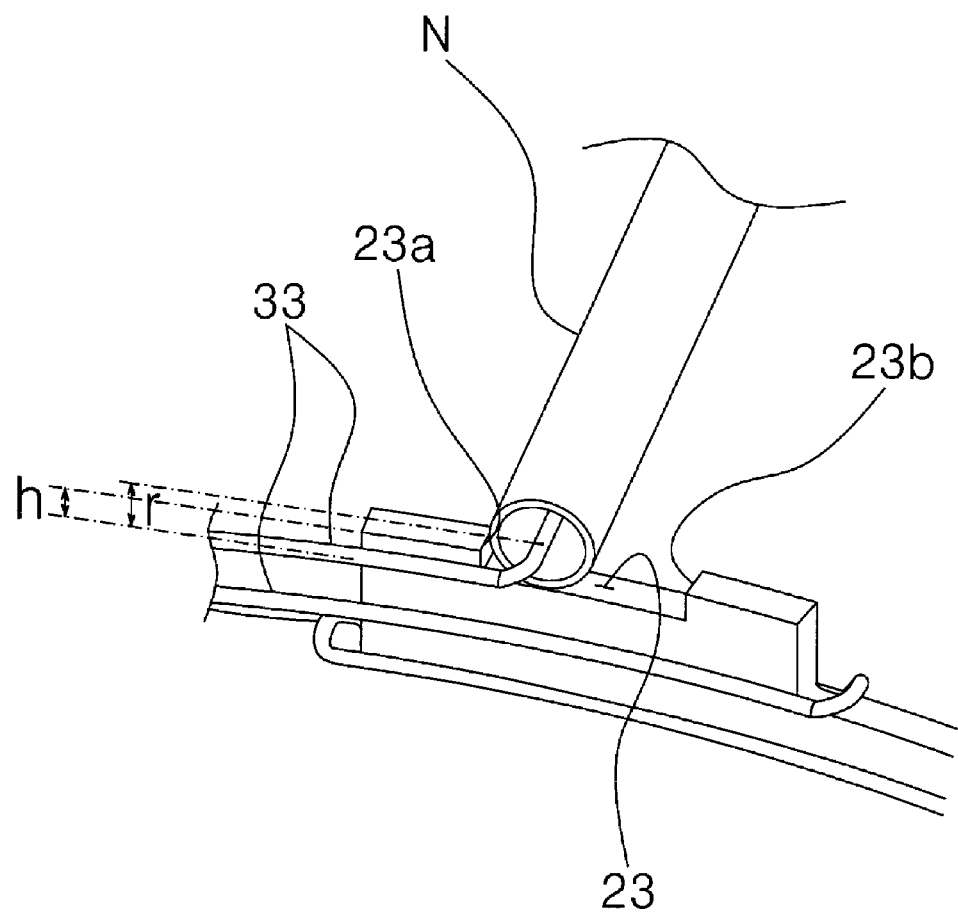
FIG. 3 is a conceptual perspective view showing the coil drawn from the nozzle of the coil winding machine escapes from a locking projection in the conventional stator for a motor.

The upper insulator 100 includes a body portion 101 adapted to cover the upper portion of the back yoke of the stator core and a teeth insulation portion 102 projected in a radial direction from the body portion 101 in such a manner as to correspond to the teeth of the stator core. Especially, the upper insulator 100 has supporting ends 111 and 112 sequentially formed to have different heights from each other so as to support the coils thereon without any contact between the coils and has locking projections 112a and 112b formed at both sides or one side of the supporting ends 111 and 112 so as to lock the coils on the supporting ends 111 and 112 without any escaping from the supporting ends 111 and 112 (See FIGS. 1 and 2).

The stator for a motor according to the present invention is characterized in that a stepped groove 113 is formed on the supporting end 112 (as shown in FIGS. 4 and 5) having the locking projections formed at one side thereof, the locking projections having a height h smaller than a radius r of the nozzle N, such that the nozzle N of the coil winding machine is accessed to the stepped groove 113. The stepped groove 113 is formed to a lower height than the supporting end 112 at a position spaced apart by a predetermined distance from the locking projections 112a and 112b. Specially, the stepped groove 113 is desirably formed wherein the height of the coil 200 drawn from the nozzle N is lower than the height of the upper end of each of the locking projections 112a and 112b. That is, the stepped groove 113 is desirably formed wherein a total of the depth d of the stepped groove 113 and the height h of each of the locking projections 112a and 112b is larger than the radius r of the nozzle N.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Industrial Applicability

According to the present invention, there is provided the stator for a motor that is configured wherein the supporting ends formed on the insulator for insulating the stator core and the coils have the stepped grooves to which the nozzle of the coil winding machine is accessed, thereby preventing the coils from escaping from the supporting ends during a coil winding operation.

The invention claimed is:

1. A stator for a motor having a stator core having an annular back yoke and teeth protruded annularly in a radial direction from the back yoke, a plurality of coils adapted to be wound on the teeth, and an insulator adapted to cover the stator core and the plurality of coils for insulation and having supporting ends and formed sequentially to have different heights so as to support the plurality of coils thereon, thereby preventing the plurality of coils from being in contact with one another and locking projections and formed at both sides or one side of the supporting ends and so as to prevent the plurality of coils from escaping from the supporting ends and, wherein each of the supporting ends having the locking projections and having a height h smaller than a radius r of a nozzle N of a coil winding machine has a stepped groove formed at a position spaced apart by a predetermined distance from the locking projections and so as to allow the nozzle N of the coil winding machine to be accessed thereto, and a total of the depth d of the stepped groove and the height h of each of the locking projections and is larger than the radius r of the nozzle N.

* * * * *